United States Patent [19]

Wunderlich

[11] 4,064,978

[45] Dec. 27, 1977

[54] ARRANGEMENT AND METHOD OF DRUM BRAKE SPRING ATTACHMENT

[75] Inventor: Langley H. Wunderlich, Dayton, Ohio

[73] Assignee: General Motors Corporation, Detroit, Mich.

[21] Appl. No.: 745,552

[22] Filed: Nov. 29, 1976

[51] Int. Cl.$^2$ .............................................. F16D 65/00
[52] U.S. Cl. ..................................... 188/331; 29/227; 188/216
[58] Field of Search ............... 188/79.5 GC, 216, 1 R, 188/78, 325, 331–333, 340–341, 250 R; 81/3 R; 29/225, 227, 229

[56] References Cited

U.S. PATENT DOCUMENTS

| 2,042,287 | 5/1936 | Allievi et al. | 29/227 |
| 2,465,030 | 3/1949 | Myers | 29/227 |
| 3,425,521 | 2/1969 | Maurice | 188/79.5 GC |

Primary Examiner—Trygve M. Blix
Assistant Examiner—Douglas C. Butler
Attorney, Agent, or Firm—D. D. McGraw

[57] ABSTRACT

The brake shoe webs of a drum brake have apertures provided adjacent the shoe ends which engage the adjusting screw. The ends of the adjusting screw spring are so shaped that they can extend through the apertures with a reverse bend of generally V configuration, causing the terminal ends of the spring to move outwardly to hook on the opposite side of each shoe web from the main spring body. A pair of spaced, axially parallel notched shafts are provided as parts of a tool for installation. The shafts receive the spring hooked ends in the notches, move apart along the axis of the spring coiled body section to tension the spring and to align the spring hooked ends with the shoe web apertures. The shafts are then moved axially to push each spring end through its aperture. The shafts are then retracted, leaving the spring hooked ends attached to the shoes.

2 Claims, 4 Drawing Figures

ARRANGEMENT AND METHOD OF DRUM BRAKE SPRING ATTACHMENT

The invention relates to a drum brake spring attaching arrangement and a method of installing the adjusting screw spring. In a drum brake assembly, a pair of brake shoes are positioned with one set of adjacent ends separated by a brake shoe adjusting screw and the other set of adjacent ends positioned to engage an anchor and to be acted upon by a wheel cylinder. A tension spring is attached to the brake shoes adjacent the adjusting screw and acts substantially parallel to the axis of the screw to hold the shoe ends and the adjusting screw in operating relation. In accordance with the invention each of the shoe assemblies has a web section with a spring-receiving aperture through the web section adjacent the shoe assembly ends engaging the adjusting screw. The tension spring is a coil spring having a coiled body section and opposite end sections formed to provide V-shaped end hooks which extend generally perpendicular with respect to the axis of the coiled body section and in the same direction relative to each other when the spring is in the free condition. The spring has terminal ends at the extreme ends of the V-shaped end hooks, the terminal ends being shorter than the portions of the V-shaped end hooks joining the coiled body section. The width of each V-shaped end hook at each spring terminal end is greater than the width of the aperture in the shoe web section with which it is to be associated. The V-shaped end hooks are flexible to permit their insertion through the shoe web apertures with the coiled body section being in tension. When the terminal ends pass through and beyond the apertures, they spring back toward their free positions to hook on the shoe webs on the opposite sides thereof from the spring coiled body section, thereby retaining the spring means on the shoe webs with the tension in the coiled body section holding the shoe assembly in operating relation with the adjusting screw.

Another aspect of the invention is a method of installing the spring. The method includes the steps of engaging a pair of notched end shafts with the V-shaped end hooks of the spring, spreading the notched end shafts apart along the spring axis to tension the spring and align the V-shaped end hooks and shafts with the apertures in the shoe webs, moving the notched shafts axially to insert the end hooks and shafts through the apertures while yieldably closing the V-shaped end hooks as necessary to pass the end hooks through the apertures until the end hook terminal ends pass through and beyond the apertures, springing the end hook terminal ends back to their free positions so that they hook on the shoe web beyond the apertures, and withdrawing the notched end shafts.

IN THE DRAWING

Figure 1:
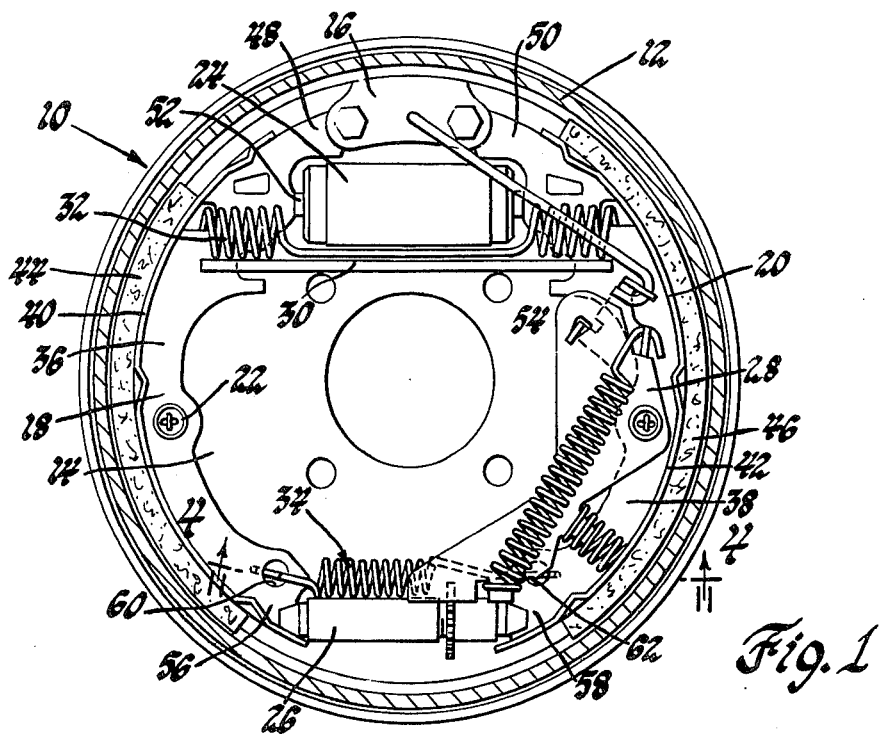
FIG. 1 is an elevation view of a drum brake assembly embodying the invention, with parts in section.

The drum brake assembly 10 is illustrated as being of the duo servo type. It includes a rotatable drum 12 which may be attached to a wheel to be braked, a backing plate 14 suitably mounted to a fixed portion of a vehicle such as a rear axle housing, a brake shoe anchor 16 secured to the backing plate, brake shoe assemblies 18 and 20 mounted on the backing plate by hold-down mechanisms (the hold-down mechanism 22 for assembly 18 being illustrated), a wheel cylinder 24, an adjusting screw 26, adjusting screw operating linkage 28, a spreader bar 30 for spreading the brake shoe assemblies when a mechanical parking brake linkage is provided, a brake shoe retraction spring 32, and an adjusting screw holding spring 34. As is well known in the art, the shoe assemblies 18 and 20 are composed of shoes having webs 36 and 38, rims 40 and 42 and brake linings 44 and 46. The shoe upper ends 48 and 50 are arranged so that they engage the anchor 16 to transmit brake torque through the anchor to the backing plate 14 and thus to a non-rotating portion of the vehicle. The wheel cylinder 24 is illustrated as having oppositely extending pins 52 and 54 which are movable outwardly by hydraulic brake fluid pressure when the brakes are applied. These pins engage the upper ends 48 and 50 of the brake shoe assemblies 18 and 20. The brake shoe retraction spring 32 is a coil tension spring with one end secured to web 36 of shoe assembly 18 and the other end secured to web 38 of the shoe assembly 20 to exert retracting forces on the brake shoe assembly and keep them in engagement with the wheel cylinder pins 52 and 54. When the disc brake assembly is used on a brake which has a mechanical parking brake incorporated, as is common on the rear wheel brakes of a vehicle, the spreader bar 30 extends between the upper ends 48 and 50 of the shoe assemblies 18 and 20 and is moved by appropriate linkage independently of the wheel cylinder 24 to actuate the brake for parking purposes, as is well known in the art. The adjusting screw 26 extends between the adjacent ends 56 and 58 of shoe assemblies 18 and 20, these being the opposite ends of the shoe assemblies from ends 48 and 50. The adjusting screw holding spring 34 is attached to the shoe webs 36 and 38 adjacent adjusting screw 26 so as to exert a tension force urging the shoe ends 56 and 58 toward each other to hold them in continuous engagement with the adjusting screw 26, as is well known in the art.

The invention relates to the particular adjusting holding spring employed and its relationship with the shoe webs, as well as the method of installing the spring. The invention may also be practiced in relation to the brake shoe retraction spring 32. It will be further described, however, only in relation to spring 34, it being recognized that the teachings are not limited to the adjusting screw holding spring.

Shoe web 36 has an aperture 60 extending therethrough adjacent shoe assembly end 56, and shoe web 38 has a similar aperture 62 therein adjacent shoe assembly end 58. The adjusting screw holding spring 34 has a coiled body section 64. The axis 66 of the coiled body section extends generally parallel to the adjusting screw 26 when the spring is installed, and therefore generally parallel to the plane of the shoe webs 36 and 38. The opposite ends of spring 34 have hook portions 68 and 70 which extend generally perpendicular to axis 66. The hook portions 68 and 70 respectively have V-shaped end hooks 72 and 74 with the terminal ends 76 and 78 thereof being shorter than the parts 80 and 82 joining the end hooks with the coiled body section 64. The width of each of the V-shaped end hooks at their terminal ends is greater than the width of the corresponding apertures 60 and 62, the end hooks being sufficiently flexible to permit insertion of the hooks through the apertures during installation. The width of each V-shaped end hook apex is substantialy less than the width of the corresponding apertures 60 and 62. In the installed position, best seen in FIG. 4, the portion 80 and 82 respectively extend through apertures 60 and 62 and the terminal ends 76 and 78 of the end hooks 72 and 74 respectively engage the sides 84 and 86 of shoe webs 36 and 38 opposite the web sides 88 and 90 where the spring coiled body section 64 is located. The end hooks 72 and 74 therefore retain spring 34 and transmit the tension force of the coiled body section 64 to the shoe assembly adjacent ends 56 and 58 to hold those shoe assembly ends in engagement with adjusting screw 26.

Figure 2:
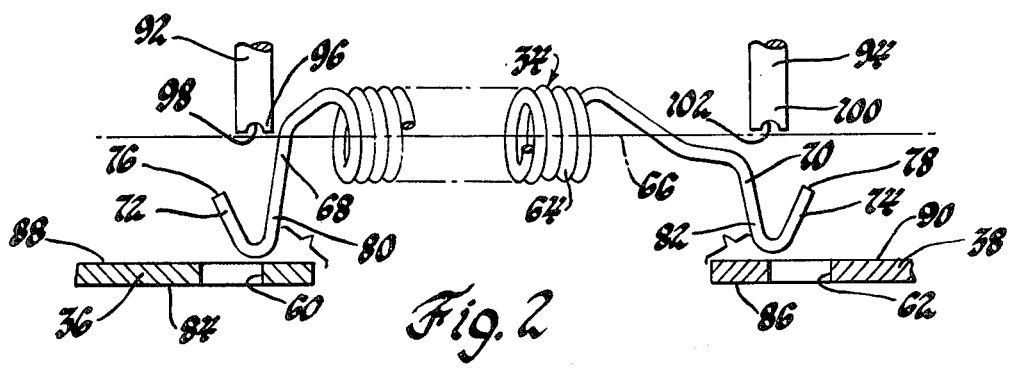
FIG. 2 is a view of the adjusting screw spring and portions of the shoe webs of the assembly of FIG. 1, together with a portion of the installation mechanism, showing the mechanism before the spring is installed.
Figure 3:
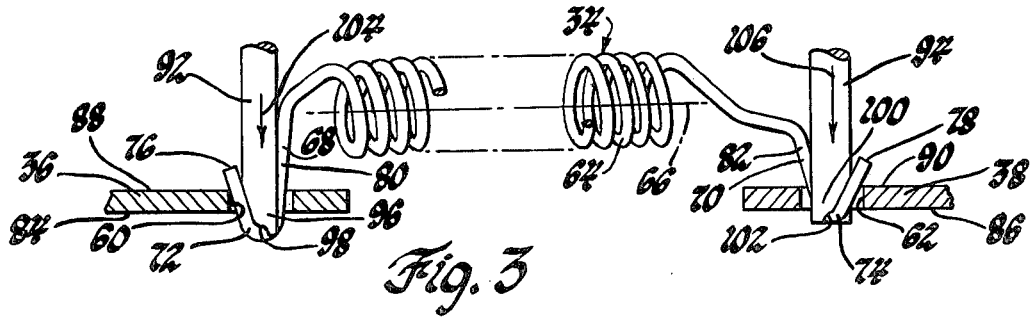
FIG. 3 is similar to FIG. 2 and showing the parts in an intermediate step during spring installation.
Figure 4:
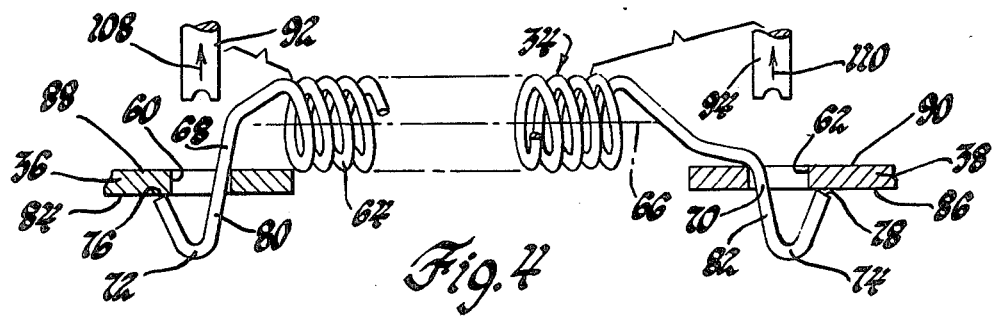
FIG. 4 is a view similar to FIGS. 2 and 3, taken in the direction of arrows 4—4 of FIG. 1, and showing the spring in the installed position with the installation tool being removed.

The method of installation of the spring 34 is illustrated in FIGS. 2, 3 and 4. An installation tool includes a pair of shafts 92 and 94 which are axially parallel. The shafts are also capable of controlled translatory movement so that they can be moved further apart in a plane containing a line which, during the process of spring installation, is substantially coincident with the axis 66 of the coiled body section 64 of spring 34. The shafts are also axially movable in both axial directions in a controllable manner. The end 96 of shaft 92 is provided with a notch 98, and the end 100 of shaft 94 has a similar notch 102. Notches 98 and 102 are engageable with the V-shaped end hooks 72 and 74. Before spring installation, the coiled body section 64 of spring 34 has a free length such that the V-shaped end hooks 72 and 74 are spaced axially apart relative to axis 66 for a distance somewhat less than the distance between shoe web apertures 60 and 62. The shaft notches 98 and 102 are engaged with the V-shaped end hooks 72 and 74 while shafts 92 and 94 are spaced apart at a similar distance. The shaft, 92 and 94 are then moved apart in a translatory manner substantially along the spring axis 66 to tension the coiled body section 64 of the spring and also to align the V-shaped end hooks 72 and 74 with apertures 60 and 62, respectively. The shafts are then moved axially as indicated by arrows 104 and 106 in FIG. 3, pushing the V-shaped end hooks 72 and 74 through apertures 60 and 62. The sizes of the apertures 60 and 62, shafts 92 and 94, and the spring wire from which the spring 34 is made are such that the V-shaped end hooks can flex sufficiently to permit insertion thereof through the apertures. During this flexure the terminal ends 76 and 78 and the end hook portions 80 and 82 approach each other. The insertion step is illustrated in FIG. 3. Once the insertion has been accomplished to the extent that the terminal ends 76 and 78 pass through apertures 60 and 62, they spring outwardly as seen in FIG. 4 past the aperture edges so that they engage shoe web sides 84 and 86, with the end hook parts 80 and 82 extending through the apertures 60 and 62. The shafts 92 and 94 are then retracted as indicated by arrows 108 and 110 in FIG. 4, removing them from the brake assembly.

This arrangement particularly lends itself to automatic assembly of the drum brake assembly. Appropriate mechanisms can be provided which feed springs 34 in proper alignment with shafts 92 and 94 and control the spreading, insertion, and release movements of the shafts to accomplish the assembly.

In this description of the invention, the adjusting screw 26 is an adjustable spacing means. When the invention is applied to spring 32, the wheel cylinder 24 or spreader bar 30 (or both) provide adjustable spacing means.

What is claimed is:

1. In a drum brake assembly having a pair of brake shoe assemblies with adjacent ends thereof separated by adjustable spacing means, and tension spring means attached to said shoe assemblies and acting substantially parallel to said adjustable spacing means to hold said shoe assembly ends and said adjustable spacing means in operating relation, the improvement in which:

each of said shoe assemblies has a web section with a spring-receiving aperture therethrough adjacent said shoe assembly ends;

said spring means is a coil tension spring having an axially extending coiled body section and transversely extending opposite end sections formed to provide V-shaped end hooks extending generally perpendicularly with respect to the axis of said coiled body section and transversely beyond said coiled body section in the same direction relative to each other when said spring is in the free condition, the spring having terminal ends at the extreme ends of said V-shaped end hooks located transversely beyond said coiled body sections, said terminal ends being shorter than the portions of the V-shaped end hooks joining said coiled body section, the width of said V-shaped ends hooks at said spring terminal ends being greater than the width of said apertures and the apexes thereof being of substantially less width than the width of said apertures, said V-shaped end hooks being flexible to permit insertion thereof through said apertures with said coiled body section being in tension and when said terminal ends pass through and beyond said apertures, said terminal ends springing back toward their free positions to hook on said shoe webs on the opposite sides thereof from said spring coiled body section and retaining said spring means on said shoe assembly webs with the tension in said coiled body section holding said shoe assembly in operating relation with said adjustable spacing means.

2. The method of installing an adjustable spacing means holding spring having V-shaped end hooks in apertures in a pair of shoe webs of adjacent brake shoe ends connected by an adjustable spacing means comprising the steps of:

a. providing a coiled spring having an axially extending coiled body section and V-shaped end hooks extending substantially perpendicular to said coiled body section;

b. providing a pair of axially parallel notched end shafts capable of relative spreading movement and of concurrent axial movements;

c. engaging the notches of the pair of notched end shafts with the V-shaped end hooks;

d. spreading the notched end shafts apart along the spring axis to tension the spring and align the V-shaped end hooks and shafts with the apertures;

e. moving the shafts axially and concurrently toward said apertures and inserting the end hooks and shafts through the apertures by such movement while yieldably closing the V-shaped end hooks as necessary to pass the end hooks through the apertures until the end hook terminal ends pass through and beyond the apertures;

f. springing the end hook terminal ends back to their free positions so that they hook on the shoe assemblies beyond the apertures;

g. and axially withdrawing the notched end shafts.

* * * * *